Dec. 28, 1948.     E. J. JOHNSON     2,457,680
THRESHER CONCAVE WITH RUBBER THRESHING BARS
Filed Jan. 5, 1945

WITNESS.

INVENTOR.
ERIC J. JOHNSON

Patented Dec. 28, 1948

2,457,680

UNITED STATES PATENT OFFICE 2,457,680

THRESHER CONCAVE WITH RUBBER THRESHING BARS

Eric J. Johnson, Moline, Ill., assignor to Deere & Company, Moline, Ill., a corporation of Illinois Application January 5, 1945, Serial No. 571,706

8 Claims. (Cl. 130—27)

The present invention relates generally to threshing apparatus and has for its principal object the provision of a novel and improved concave of greater efficiency and otherwise better operation.

More specifically it is an object of my invention to provide a threshing concave which is particularly well adapted for use in threshing rice, but which can also be used for other grains. As is well known to those skilled in the art, rice is more difficult to thresh than many other crops for the reason that, when threshing with conventional mechanism, many of the kernels may be cracked or broken if the threshing mechanism is sufficiently aggressive to thresh the entire crop without loss. Therefore, it is a further specific object of my invention to provide a rice concave which is sufficiently aggressive to thresh the entire crop without appreciable loss, but without cracking or otherwise damaging the kernels of rice.

Figure 2:
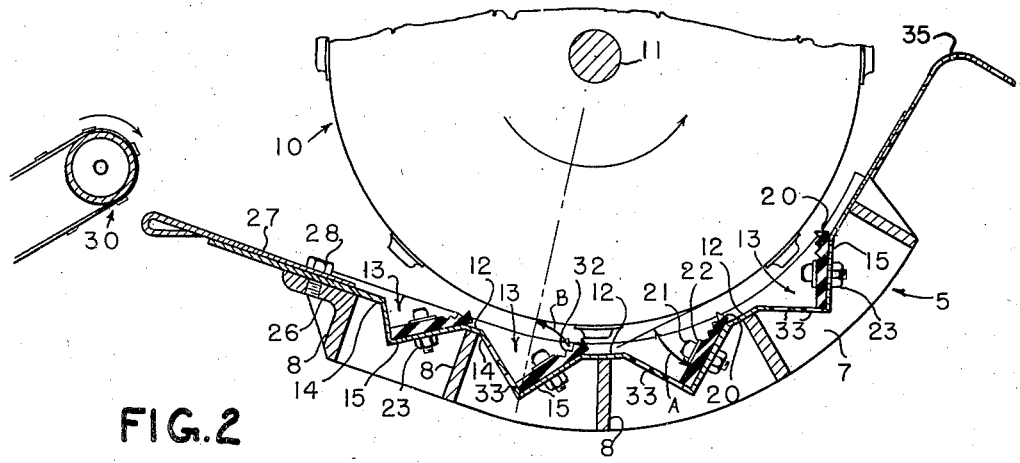
Figure 1:
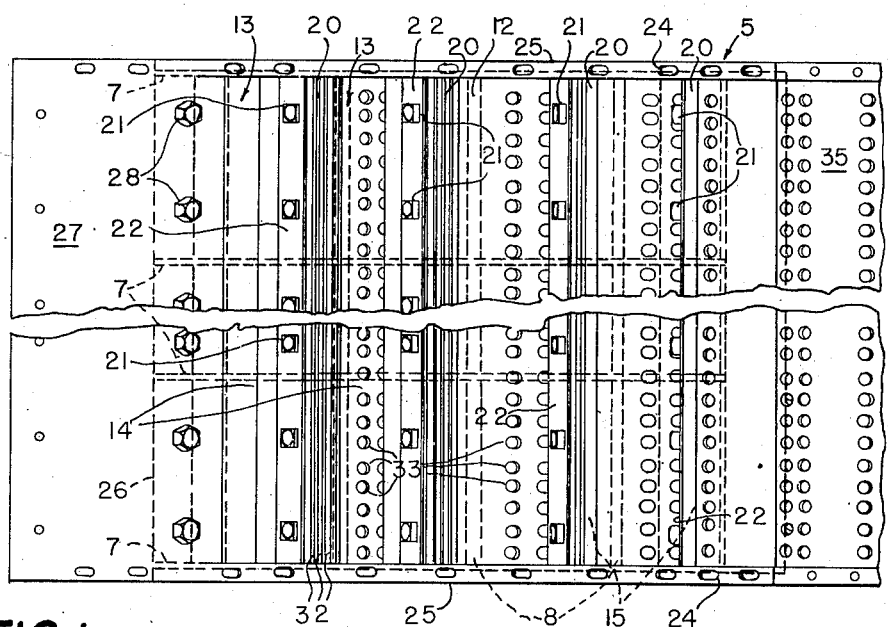

These and other objects and advantages of my invention will be apparent to those skilled in the art after a consideration of the following description, in which reference is had to the drawings appended hereto, in which Figure 1 is a plan view of a thresher concave embodying the principles of my invention, and Figure 2 is a sectional elevational view taken longitudinally through a threshing device including a cylinder and concave.

Referring now to the drawings, the concave is indicated in its entirety by the reference numeral 5 and comprises a supporting frame 6 including a plurality of laterally spaced concavely curved longitudinally extending frame bars 7 and a plurality of longitudinally spaced transversely extending frame bars 8 rigidly fixed thereto to form a grid. The grid 6 is curved in an arc about the axis of rotation of a threshing cylinder 10, which is rotatably mounted on a shaft 11 above the concave 5. The frame bars 7, 8 are rigidly interconnected, as by welding, to form the grid 6.

Supported on the frame or grid 6 is a curved sheet metal pan or trough 12, which is also curved in an arc substantially about the axis of the cylinder shaft 11 and is provided with a series of longitudinally spaced transversely extending grooves or depressions 13, which are formed by bending the sheet metal pan 12 to form a pair of downwardly converging walls 14, 15. The forward wall 14 of each pair is inclined downwardly and rearwardly toward the apex of each groove 13, which is V-shaped in cross section, while the rearward wall 15 of each groove is inclined from the apex rearwardly and upwardly.

The threshing element on the concave 6 is indicated by the reference numeral 20, each of which comprises a flat rubber bar or strip which extends transversely from one end of the concave to the other and lies flat against the upwardly and rearwardly inclined wall 15 of each groove 13. The width of each rubber bar 20 is greater than the width of the associated wall 15, so that with one edge of the rubber bar at the vertex or bottom of the groove 13, the bar extends outwardly beyond the upper edge of the wall 15 or, in other words, beyond the curved surface of the sheet metal pan 12, and is unsupported at its upper or rearward edge. The thickness of the rubber bar is sufficient so that the upper unsupported edge does not sag of its own weight, but the thickness is appreciably less than the width of the rubber bar 20. The rubber bars 20 are secured to the inclined walls 15 by means of laterally spaced bolts 21, which are inserted through aligned openings in the wall 15, the rubber strip 20, and through a metal strip 22 and are rigidly secured by nuts 23 threaded on the lower ends of the bolts 21 beneath the wall 15, thus the heads of the bolts 21 are disposed down in the grooves 13, and the metal strips 22 serve to prevent the heads of the bolts 21 from imbedding into the rubber. The strips 22 if desired could be replaced by any other suitable means, such as washers, for increasing the area of the bearing surface, as is well known to those skilled in the art.

Mounting flanges 25 are provided along the outer sides of the two outer longitudinal frame bars 7 and these flanges are provided with apertures or slots 24 which are adapted to receive bolts for securing the concave 6 in a body of a thresher or combine (not shown). The front transverse member 8 is provided with a forwardly extending upper flange 26, to which is secured a metal apron 27 by suitable bolts 28.

During operation, the harvested grain is fed to the threshing mechanism by means of a conveyor indicated at 30, which delivers the crop over the apron 27 to the concave. The cylinder 10 rotates in the direction shown by the arrow and is provided with transversely disposed conventional thresher bars 31 preferably of the rasp bar type, which rub the grain against the rubber bars 20 to separate the kernels from the stalks. The upper surface of each of the rubber concave bars 20 is corrugated, as indicated at 32, against which the straw is rubber, and the friction of the straw against the rubber bars retards the straw considerably, thereby permitting the rasp bars to strip the kernels of rice or other grain from the stalks. The yielding resilient characteristics of the rubber bars prevent the kernels of grain from being cracked or broken.

The downwardly and rearwardly inclined walls 14 of the grooves 13 are provided with a plurality of perforations 33, which permit the threshed kernels of grain to drop through the concave to the grain pan or other device (not shown), which is provided in the conventional thresher for receiving the grain.

It will be noted that in the embodiment shown and described herein, there are four rubber concave bars 20, although a lesser number can be used if so desired. Preferably, each of the rubber bars is disposed in a plane which intersects the plane tangent to the periphery of the cylinder at an acute angle A, which is the same for all of the four rubber bars. The flat sides of the bars are inclined rearwardly at an acute angle to planes which pass through the axis of curvature of the concave and intersect the respective bars, as indicated at B and the corresponding angles for each of the four bars are equal.

After the kernels have been threshed from the straw, the latter is discharged upwardly and rearwardly over a downwardly curved metal sheet 35 which is secured along the rear edge of the concave pan or trough.

I claim:

1. In a thresher, a concave comprising a curved perforated sheet metal pan creased inwardly to provide a zigzag cross section defining transverse grooves in the concave side thereof, a rubber bar disposed in each groove and projecting outwardly therefrom in unsupported relation toward the center of curvature, and means disposed within said grooves below the tops thereof for securing said bars therein.

2. In a thresher, a concave comprising a curved pan having transverse grooves of V-shaped cross section, a rubber bar disposed in each groove against the rear side of the latter inclined in the direction of movement of the threshing cylinder and having an outer edge projected outwardly of said groove in unsupported relation, and means securing said bars in said concave.

3. In a thresher, a concave comprising a curved pan having transverse grooves, each groove being defined by a downwardly and rearwardly inclined wall and an upwardly and rearwardly inclined wall, flat rubber bars lying against said upwardly and rearwardly inclined walls, respectively, and having rear edges projecting in unsupported relation beyond the upper edges of the latter walls, and means in said grooves for securing said bars therein.

4. In a thresher, a concave comprising a curved steel metal pan having transverse grooves depressed therein, each groove being defined by a downwardly and rearwardly inclined wall, the latter being perforated to permit passage of threshed grain therethrough, and an upwardly and rearwardly inclined wall, flat rubber bars lying against said last mentioned walls, respectively, and having rear edges projecting upwardly beyond the upper edges of the associated walls in unsupported relation, and means for securing said bars to said upwardly and rearwardly inclined walls.

5. In a thresher, a concave comprising a frame including a plurality of laterally spaced concavely curved longitudinally extending frame bars and a plurality of longitudinally spaced transversely extending frame bars rigidly fixed thereto to form a grid, a sheet metal concave pan secured to said grid and having transverse grooves depressed therein between said transverse frame bars, each groove being defined by a downwardly and rearwardly inclined wall and an upwardly and rearwardly inclined wall, flat rubber bars lying against said last mentioned walls, respectively, and securing bolts extending through aligned openings in said bars and said upwardly and rearwardly inclined walls for securing said bars thereto.

6. In a thresher, a concave comprising a frame including a plurality of laterally spaced concavely curved longitudinally extending frame bars and a plurality of longitudinally spaced transversely extending frame bars rigidly fixed thereto to form a grid, a sheet metal concave pan secured to said grid and having transverse grooves depressed therein between said transverse frame bars, each groove being defined by a downwardly and rearwardly inclined wall and an upwardly and rearwardly inclined wall, flat rubber bars lying against said last mentioned walls, respectively, and having rear edges projecting upwardly beyond the upper edges of the associated walls in unsupported relation, and bolts extending through aligned openings in said upwardly and rearwardly inclined walls and in the lower portions of said flat rubber bars, respectively, for securing the latter.

7. In a thresher, a concave comprising a frame curved concavely, a plurality of longitudinally spaced, transverse rubber bars having a width appreciably greater than the thickness thereof, and means for securing said bars in supported relation on said concave frame with the flat sides of the bars inclined rearwardly at acute angles to planes in which lie the transverse axis of curvature of said concave and intersecting the respective bars, said securing means engaging the lower portions of said bars, with the upper rear edges of said bars projecting upwardly beyond said frame in unsupported relation.

8. In a thresher, a concave frame and means defining a bar-supporting surface extending axially of said concave frame and inclined in the direction of movement of grain at an acute angle to a plane in which lies the axis of curvature of the concave and which intersects said surface, and a flat rubber threshing bar having a width appreciably greater than its thickness and disposed with its flat side against said inclined surface, but with the inner edge projecting upwardly beyond said bar-supporting surface in unsupported relation, and bolt means securing the lower edge of said bar to said concave.

ERIC J. JOHNSON.

REFERENCES CITED

The following references are of record in the file of this patent:

UNITED STATES PATENTS

| Number | Name | Date |
|---|---|---|
| 295,305 | Swingle | Mar. 18, 1884 |
| 2,227,225 | Lackey | Dec. 31, 1940 |
| 2,262,453 | Dray | Nov. 11, 1941 |
| 2,305,964 | Harrison | Dec. 22, 1942 |
| 2,349,380 | Rietz | May 23, 1944 |